United States Patent [19]

Hescher

[11] Patent Number: 5,412,523
[45] Date of Patent: May 2, 1995

[54] HOLDING AND ADJUSTING APPARATUS FOR A ROTATING MAGNETIC HEAD ARRANGEMENT

[75] Inventor: Manfred Hescher, Weiterstadt, Germany

[73] Assignee: Robert Bosch GmbH, Stuttgart, Germany

[21] Appl. No.: 276,318

[22] PCT Filed: Feb. 2, 1988

[86] PCT No.: PCT/DE88/00045
  § 371 Date: Oct. 6, 1988
  § 102(e) Date: Oct. 6, 1988

[87] PCT Pub. No.: WO88/06333
  PCT Pub. Date: Aug. 25, 1988

[30] Foreign Application Priority Data
  Feb. 10, 1987 [DE] Germany ............... 37 03 988.1

[51] Int. Cl.$^6$ ................... G11B 5/56; G11B 21/24
[52] U.S. Cl. ................................................ 360/109
[58] Field of Search ........................... 360/104, 109

[56] References Cited

U.S. PATENT DOCUMENTS

| | | | |
|---|---|---|---|
| 4,329,724 | 5/1982 | Clayton | 360/109 |
| 4,497,005 | 1/1985 | Heinz | 360/109 |
| 4,768,117 | 8/1988 | Mihara | 360/104 |

FOREIGN PATENT DOCUMENTS

| | | | |
|---|---|---|---|
| 0012441 | 6/1962 | Japan | 360/109 |
| 0254473 | 12/1980 | Japan | 360/109 |
| 0079422 | 5/1984 | Japan | 360/104 |
| 0191108 | 10/1984 | Japan | 360/104 |

*Primary Examiner*—John H. Wolff
*Attorney, Agent, or Firm*—Michael J. Striker

[57] ABSTRACT

A holding and adjusting apparatus for a rotating magnetic head arrangement having two magnetic heads at a free end of a tracking mechanism, including a head carrier having two portions for supporting the two magnetic heads and a plurality of screws for adjusting a relative position of the two magnetic heads independently of one another.

4 Claims, 3 Drawing Sheets

HOLDING AND ADJUSTING APPARATUS FOR A ROTATING MAGNETIC HEAD ARRANGEMENT

BACKGROUND OF THE INVENTION

The invention related to a holding and adjusting apparatus for a rotating magnetic head arrangement. A two-channel magnetic tape recorder for recording and-/or playing back digitally encoded video signals is already known from EP-OS 158 373, in which a magnetic tape is coiled around a scanning device at an angle of approximately 180° and which therefore comprises two pairs of recording and playback magnetic heads which are located diametrically opposite one another. In order for the magnetic heads to precisely follow the previously recorded tracks on the magnetic tape during playback, each pair of these magnetic heads, which are located closely adjacent to one another, is arranged on a piezoelectric deflecting element which enables a displacement of this magnetic head pair transversely relative to the track direction on the basis of corresponding track following signals. The recorded track picture of the magnetically readable tracks on the magnetic tape must generally correspond to the established standard with very close tolerances so as to ensure the exchange of magnetic tapes between devices of the same type. The relative position of the two magnetic heads of a magnetic head pair relative to one another must therefore be adjustable within very close tolerances.

An embodiment of such a holding device for two magnetic heads which are arranged closely adjacent to one another is disclosed in EP-OS 144 719. However, this involves a recording and playback magnetic head and an adjacent erasing head. This publication also does not show how the relative position of the two magnetic heads relative to one another can be adjusted with existing manufacturing tolerances.

Therefore, in a track following device of a magnetic recording and playback device, according to the EP-OS 54 419, the four magnetic heads, which are arranged in a row for parallel recording of digitally encoded video signals, are arranged on a slotted block at the tip of a piezoelectric deflecting device, wherein the height adjustment of the magnetic heads relative to one another enables a division into individual block parts. In this construction, however, the distance of the magnetic heads from one another must already lie within the allowable tolerances and cannot be changed subsequently. Moreover, the height adjustment within the required close tolerance areas is difficult to effect because of the resilient material characteristics.

A similar suggestion for changing the relative position of two adjacent magnetic heads on a rotating head wheel is disclosed in DE-OS 31 21 791. The arrangement of each magnetic head on a spring small metal plate makes it possible, in conjunction with adjusting screws provided transversely relative to a bending direction, to adjust the height of the magnetic heads relative to one another and to a reference plane, but no auxiliary means is provided for the likewise difficult angle adjustment and the adjustment of the spacing (distance) relative to one another.

An adjusting device for two magnetic heads, which are arranged diametrically at the circumference of a revolving head disk, is already known from the U.S Pat. No. 3,679,838. The adjusting device permits height and circumferential adjustment of each magnetic head by expanding elements and pressure screws. In addition, DE-AS 2361802 discloses an adjusting device for a magnetic head which is displaceable on a carriage along a chord of the head wheel disk. However, the known apparatus serves to adjust the end projection of the head mirror over the radius of the revolving head disk.

Moreover, U.S. Pat. 4,117,522 discloses a precision adjusting apparatus for adjusting the height of a magnetic head, its angular position in the radial direction, and its angular position in the circumferential direction. However, the position of the magnetic head in the circumferential direction, i.e. the distance from the rest of the additional magnetic heads arranged at the circumference of the head wheel, cannot be adjusted.

Finally, a converter holding device for a tape recording and/or playback device is known from the DE-OS 31 14 453, which enables an adjustment of every converter arranged at the circumference of a head disk in radial and circumferential directions. For this purpose, every transducer is fastened on a carrier which can be displaced in two directions by a plurality of screws bevel heads which engage the carrier at various places. An angular adjustment of the converter gap in the azimuth direction is not possible.

All of the holding and adjusting devices known to the Applicant herein have in common the fact that they either enable an adjustment in only two of three possible axial directions or require so much space that their application to closely located magnetic heads is not possible.

SUMMARY OF THE INVENTION

It is a general object of the present invention to develop a holding and adjusting apparatus, which makes possible a triaxial adjustment and a change of position in space in two perpendicular planes one above the other of closely located magnetic heads.

This object is achieved by providing a holding and adjusting apparatus for a rotating magnetic head arrangement with two magnetic heads which apparatus comprises adjusting means for charging relative position of the two magnetic heads in space independently from one another.

In contrast to the devices disclosed in prior art, the holding and adjusting apparatus according to the invention has the advantage that magnetic heads which are arranged closely adjacent to one another at the circumference of a head disk are adjustable independently of one another with respect to the distances and angles of their working gaps. Another advantage consists in that the apparatus can be made small and light, so that the arrangement at the free end of a piezoelectric deflecting device keeps down the size of movable masses.

It is particularly advantageous that, when adjusting a magnetic head in the direction of an axis or plane, the previously adjusted parameters remain unchanged, or not substantially changed.

BRIEF DESCRIPTION OF THE DRAWINGS

The invention both as to its construction and its method of operation, together with additional objects and advantages thereof, will be best understood from the following description of the preferred embodiments with reference to the accompanying drawing wherein.

DESCRIPTION OF THE PREFERRED EMBODIMENTS

Figure 1:
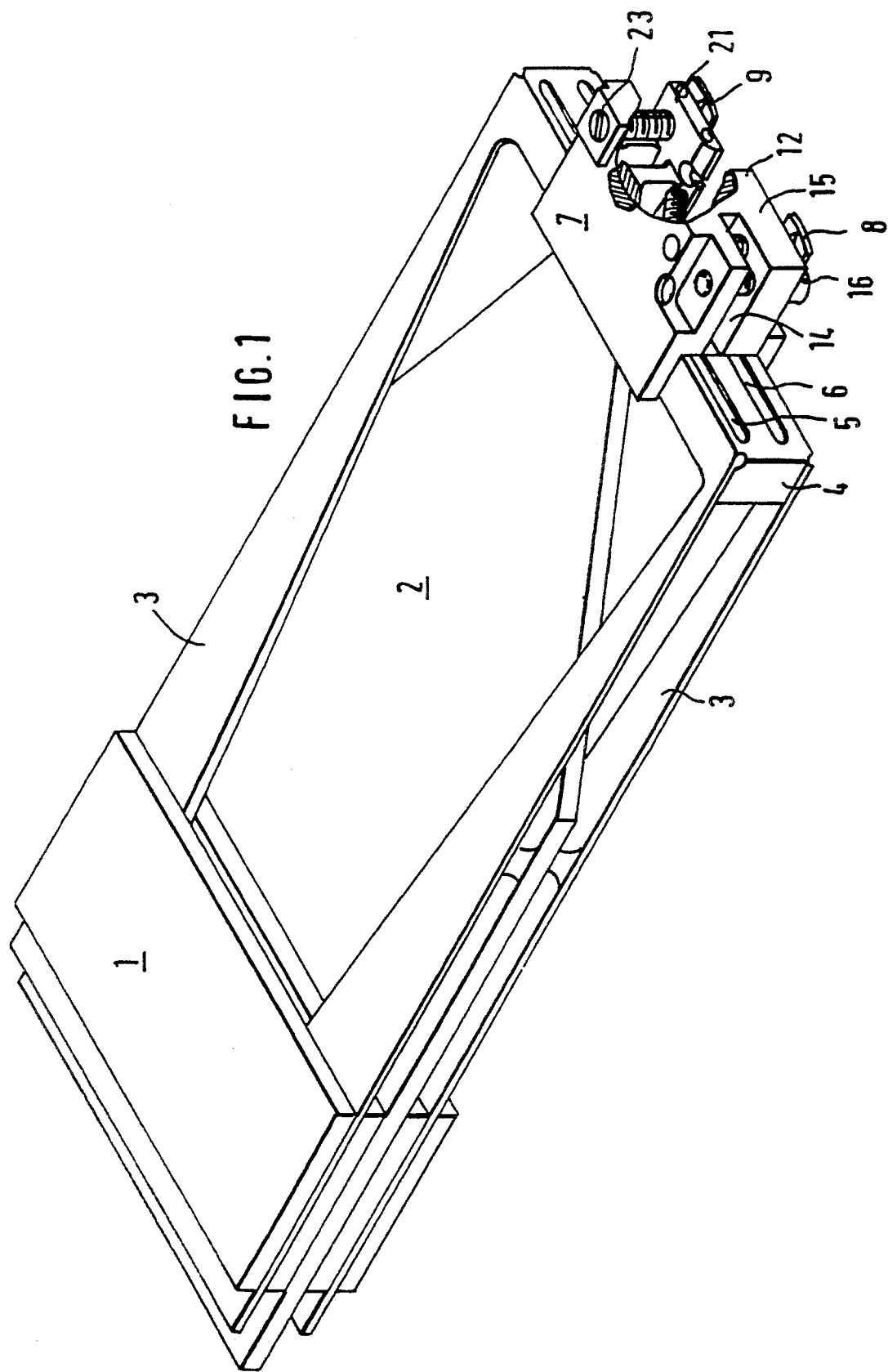
FIG. 1 is a perspective view of a first embodiment of the holding and adjusting apparatus at the free end of a deflecting device which is driven by a piezoelectric element.

FIG. 1 shows a piezoelectric deflecting element 2 and two frames 3, which have the shape of a parallelogram and are spaced at both sides, being arranged in a laminated block 1. A fastening shoulder 4 is provided at a free end of the piezoelectric deflecting element. The two frames 3 and a head carrier 7 are fastened in grooves 5, 6 of the fastening shoulder 4. The two frames 3 engage inner surfaces of the head carrier 7, a magnetic head 8, 9 is and extend in two different fastening planes with a magnetic head 8, 9 being glued to a respective frame. In order to adjust the relative position of the two magnetic heads 8, 9 relative to one another, different adjusting screws are provided at the head carrier 7 which enable an independent adjustment of an angular position, height, and distance of the two magnetic heads relative to one another due to a suitable construction of the head carrier.

Figure 7:
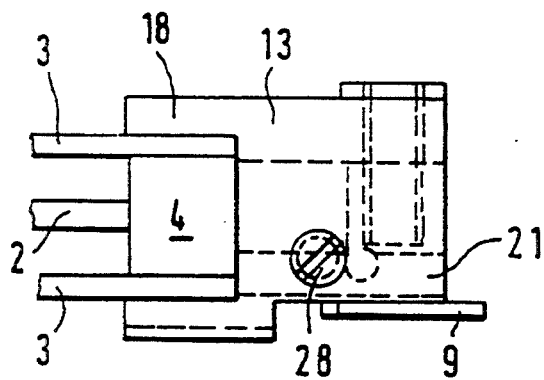
FIG. 7 is a side view of the apparatus shown in FIG. 5.
Figure 8:
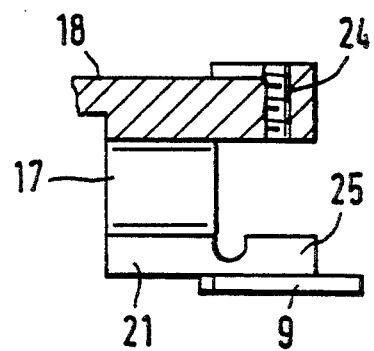
FIG. 8 is a sectional view along the line ABCD in FIG. 5.

To this end, a slot 11 divides the head carrier 7 into two carrying parts 12 and 13 (FIG. 7). The carrying part 12 has a horizontal slot 14 that defines a horizontally extending tab 15 to which the magnetic head 8 is fastened and which can be deformed by a screw 16, which extends transversely relative to the slot 14, and serves to adjust an angular position of the magnetic head 8.

The second carrying part 13 is shaped as a pole carrier by a central cut out portion 17 which has an approximately rectangular shape. Two longitudinal bars 19, 20 extend parallel to one another from the base 18 at both sides of the cut out portion 17 to a cover plate 21 which carries the magnetic head 9. The longitudinal bars 19, 20 of the carrying part 13 can be deformed by an inclined pressing pressure screw 22, which is guided in a thread in the carrying part 12, so that the relative distance of the working gaps of the two magnetic heads 8, 9 can be slightly adjusted in order to compensate for tolerances which may exist. A tongue 25 of the cover plate 21 formed by milling, can be deformed with the vertically extending pressure screw 23, which is guided in a thread 24 in the base 18 of the carrying part 13, far enough so that the height or track position of the magnetic head 9 fastened to the cover plate 21 can be adjusted.

Figure 2:
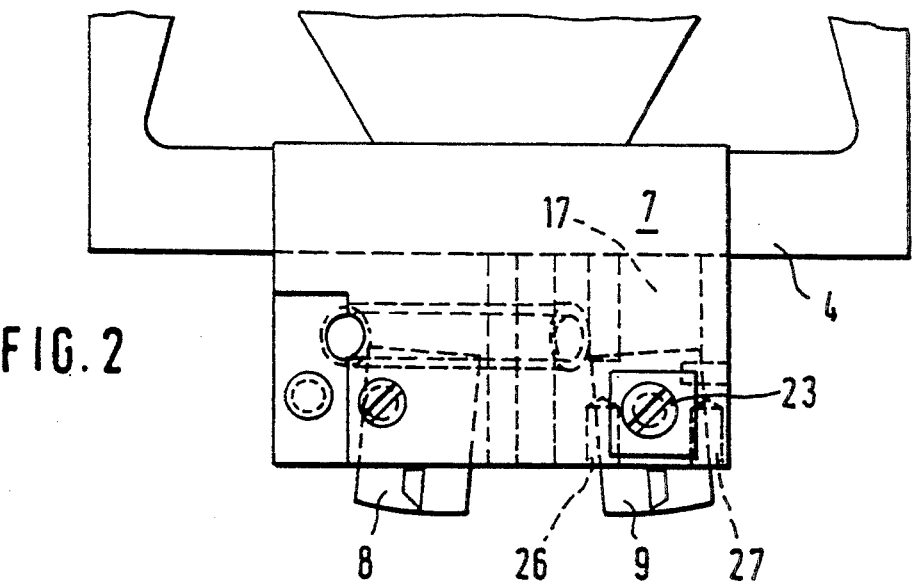
FIG. 2 is a top view of the holding and adjusting apparatus in an enlarged scale.
Figure 3:
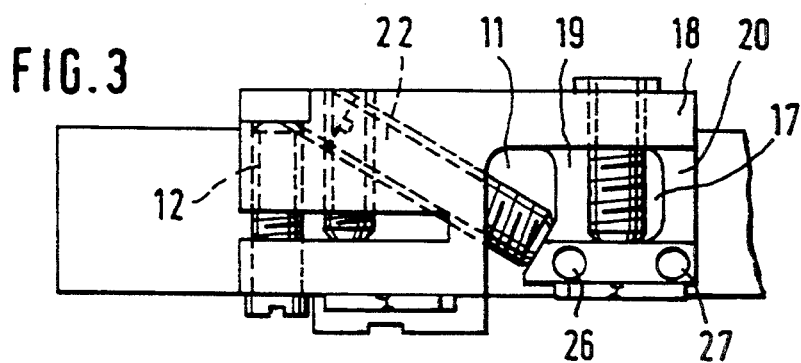
FIG. 3 is a front view of the same apparatus.
Figure 4:
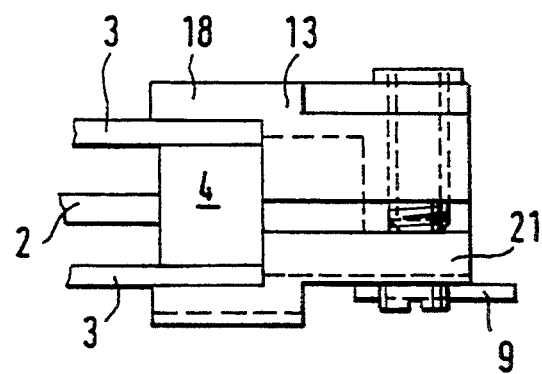
FIG. 4 is a side view of the same apparatus.
Figure 5:
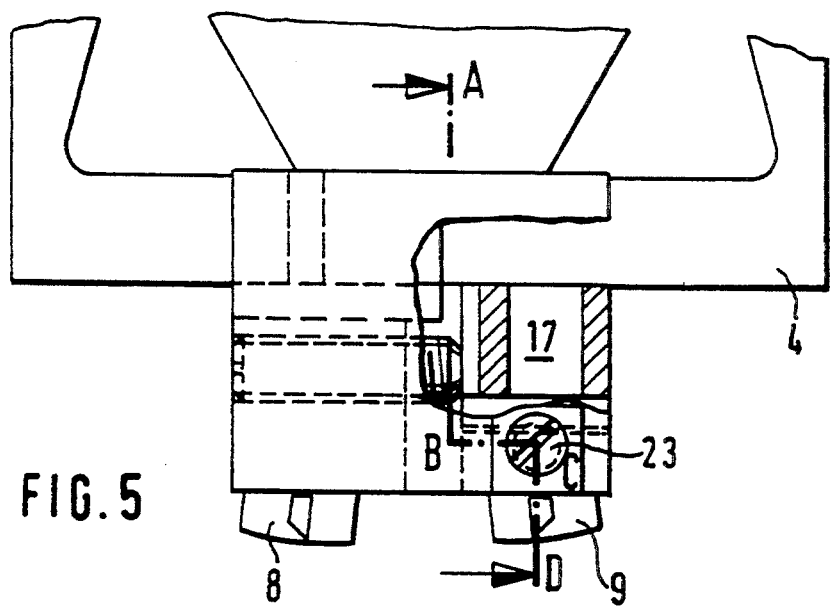
FIG. 5 is a top view of another embodiment of the holding and adjusting apparatus according to the present invention in enlarged scale.
Figure 6:
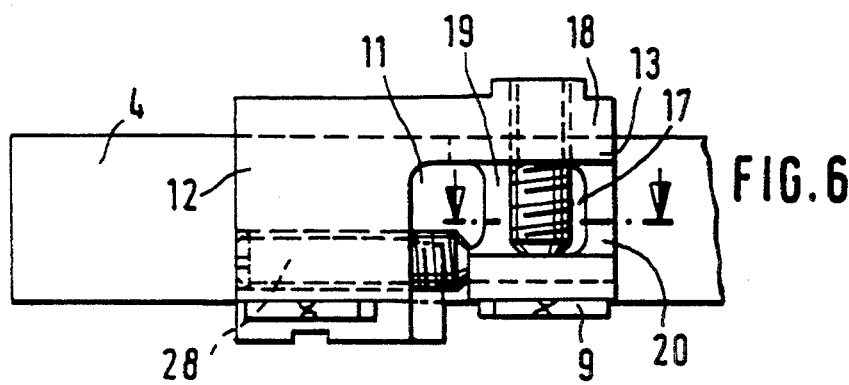
FIG. 6 is a front view of the apparatus shown in FIG. 5.

The holding and adjusting apparatus, according to the invention, is shown in a top view in FIG. 2 in enlarged scale. The drawing shows the head carrier 7 with the two magnetic heads 8, 9, whose distance from one another is adjusted by a pressure screw 22 (FIG. 3), which engages the cover plate 21 and adjusts the distance of the two working gaps of the magnetic heads 8, 9, the two longitudinal bars 19, 20 being slightly deformed in an S-shaped manner. In addition, two spaced bores 26, 27 are provided at the front side in the cover plate 21 for receiving a socket screw wrench, with which the angular position of the head gap of the magnetic head 9 can be adjusted by mechanical deformation.

Another embodiment of a holding and adjusting apparatus according to the invention is shown in FIGS. 5 to 8. This embodiment differs from that described in FIGS. 1 to 4 in that the adjusting bore holes 26, 27 for the azimuth adjustment of the magnetic head 9 are eliminated and a screw 28, which acts on the cover plate 21 in the horizontal direction, is provided. Moreover, both holding and adjusting devices are constructed in the same manner, and the same reference numerals are used in FIGS. 5 and 8 for the same functioning parts. The holding and adjusting device according to the second embodiment permits to adjust the height position of the two magnetic heads 8, 9 relative to one another and to adjust their distance relative to one another without influencing the angular position of the working gaps in an undesirable manner.

While the invention has been illustrated and described as embodied in a holding and adjusting apparatus for a rotating magnetic head arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A holding and adjusting apparatus for a rotating magnetic head arrangement having tracking means for supporting a head carrier at a free end of said tracking means, the head carrier comprising two carrying parts (12, 13) for supporting first and second magnetic heads (8, 9), respectively, one of the carrying parts (12) having a slot (14) extending parallel to a tracking direction of the first magnetic head (8), the carrying part (12) including a first screw (16) for adjusting the width of the slot (14) to change an azimuth angle of the first magnetic head (8), the other of said carrying parts (13) having a central cut-out portion (17) and two side bars (19, 20) defined thereby, and further comprising a cover plate (21) and a first pressure screw (22) extending in said cover plate (21) for deforming said side bars (19, 20) in an S-shaped manner to adjust a distance between the two magnetic heads (8, 9).

2. An apparatus according to claim 1, wherein said other carrying part (13) has a slot on a circumferential side at an end of said other carrying part (13) which slot extends parallel to a tracking direction of the second magnetic head (9) supported by said other carrying part (13), and a second screw (23) extending transverse to said slot of said other carrying part for correcting a track position of said second magnetic head (9).

3. A holding and adjusting apparatus for a rotating magnetic head arrangement having first and second magnetic heads, the apparatus comprising tracking means for supporting the two magnetic heads located at a free end of said tracking means; adjusting means for changing a relative position of the two magnetic heads in space independent of one another; said tracking means including a head carrier having two carrying parts for supporting the two magnetic heads, respectively; one of said two carrying parts having a slot extending parallel to a tracking direction of the first magnetic head, said adjusting means including a first screw for adjusting the width of the slot and thereby an azimuth angle of the first magnetic head; said adjusting means including a first pressure screw for adjusting a distance between the two magnetic heads; the other of said carrying parts having a central cut-out portion and two side bars defined thereby; said apparatus further comprising a cover plate; and said adjusting means including a second pressure screw extending in said cover plate for deforming said side bars in an S-shaped manner.

4. An apparatus according to claim 3 wherein said other carrying part has a slot on a circumferential side at an end of said other carrying part which slot extends parallel to a tracking direction of the second magnetic head supported by said other carrying part, said adjusting means including a second screw extending transverse to said slot of said other carrying part for correcting a track position of said second magnetic head.

* * * * *